UNITED STATES PATENT OFFICE.

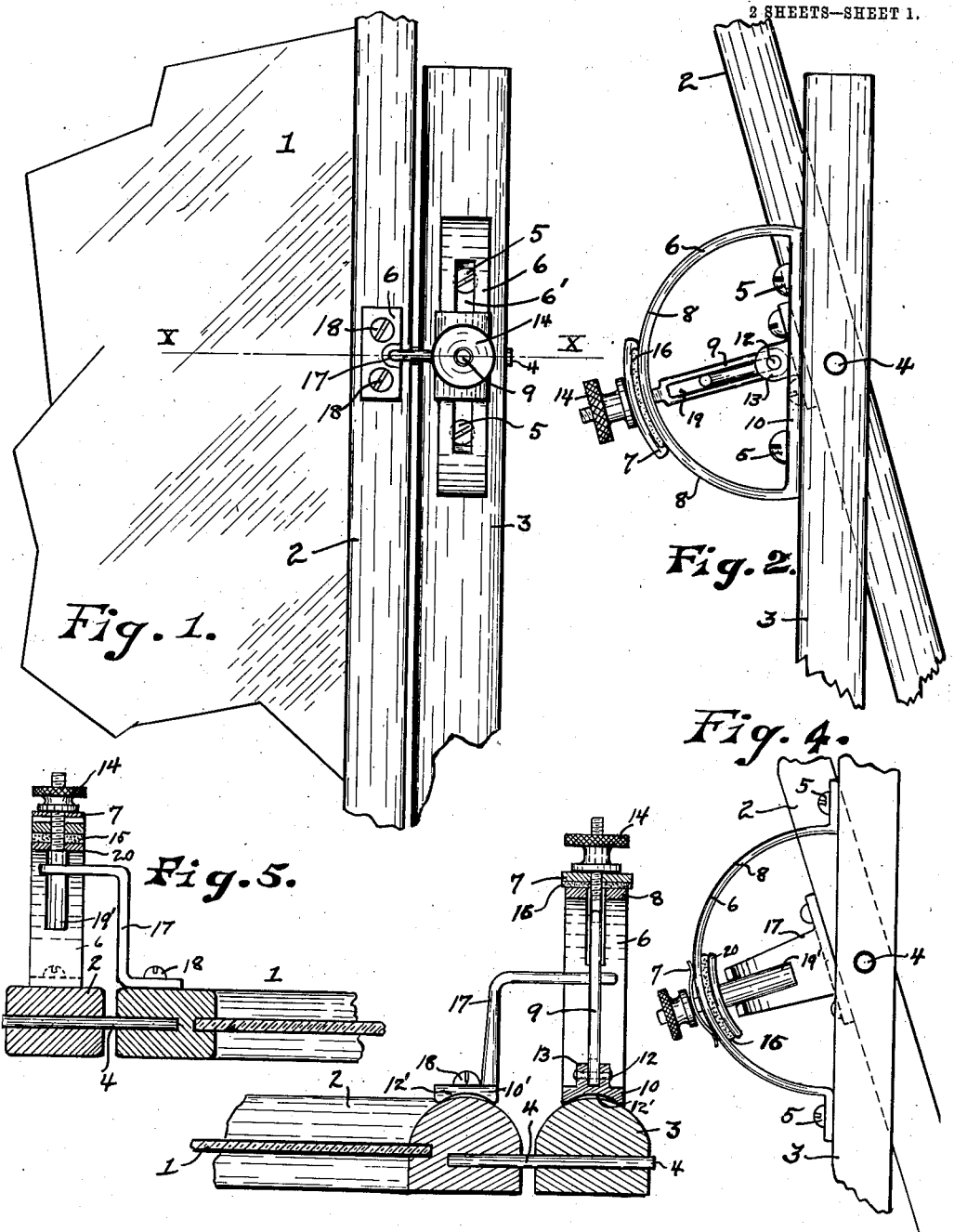

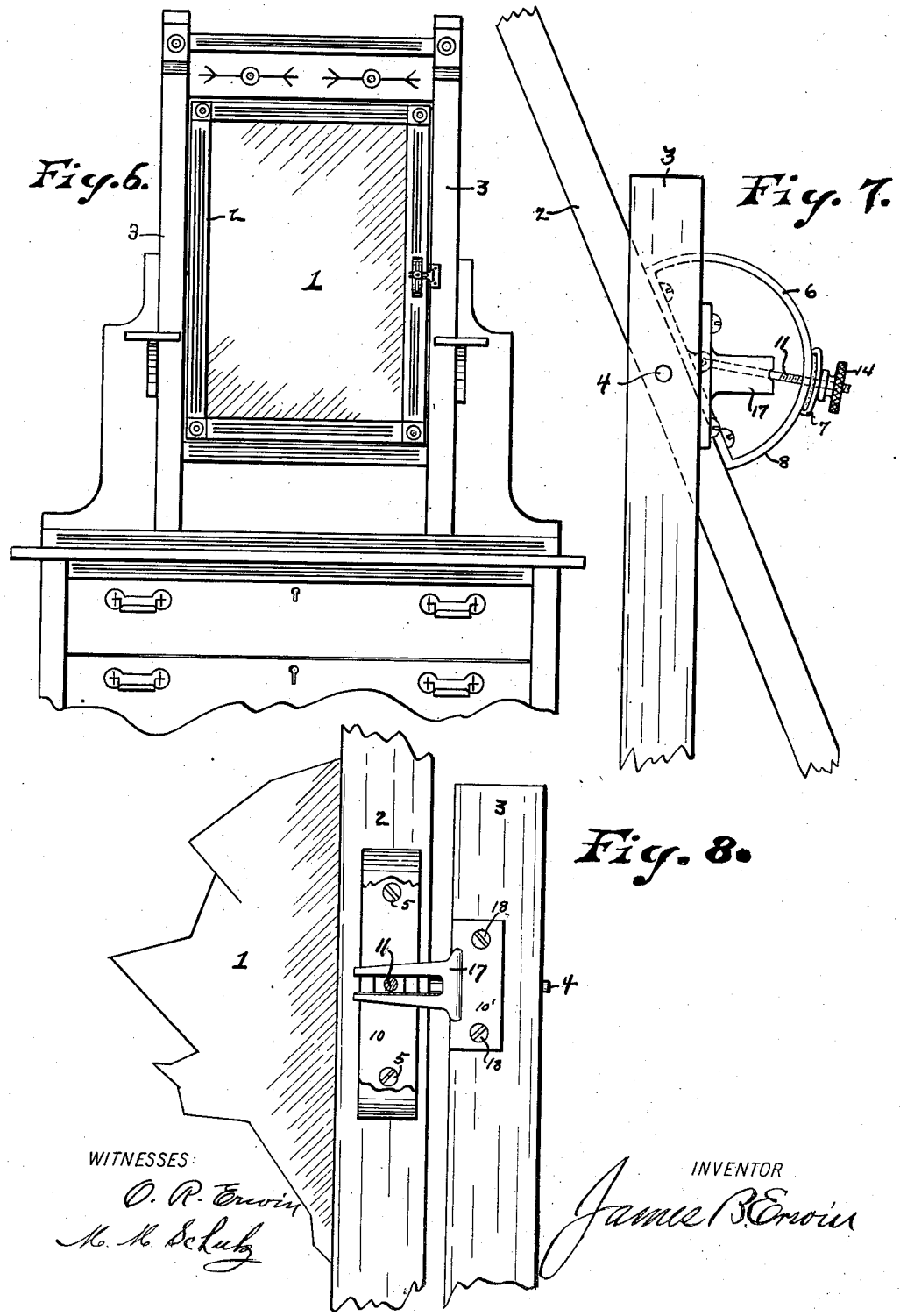

JAMES B. ERWIN, OF MILWAUKEE, WISCONSIN.

ADJUSTABLE MIRROR-HOLDER.

No. 833,592.      Specification of Letters Patent.      Patented Oct. 16, 1906.

Application filed November 25, 1905. Serial No. 289,011.

*To all whom it may concern:*

Be it known that I, JAMES B. ERWIN, a citizen of the United States, residing at the city of Milwaukee, county of Milwaukee, and State of Wisconsin, have invented new and useful Improvements in Adjustable Mirror-Holders, of which the following is a specification.

My invention relates to improvements in adjustable mirror-holders.

The object of my invention is to provide a device by which the pivotally-supported mirrors which are used in connection with dressing-cases or other furniture will be retained at any desired point of adjustment; and it pertains more especially, first, to the construction of a circular bearing-plate; second, to the device for adjustably supporting a slidable friction-brake at a central point within the circle described by said bearing-plate, and, third, to the device for adjustably connecting the mirror-frame with the brake mechanism in such a manner that they will coöperate perfectly regardless of the fact that they are not always attached to the mirror-frame and frame-supporting standards in exactly the same relative position to each other.

My invention is explained by reference to the accompanying drawings, in which—

Figure 1 represents a front view thereof attached to one side of a mirror-frame and frame-supporting standard. Fig. 2 represents a side view of the device shown in Fig. 1. Fig. 3 represents a transverse section of the device, drawn on line *x x* of Fig. 1. Fig. 4 represents a side view. Fig. 5 represents a transverse section of a modified form of the device with pivotal connection of the brake mechanism omitted. Fig. 6 and Fig. 7 represent similar views to those shown in Figs. 1 and 2 with the semicircular bracket attached to mirror-frame and the brake-actuating arm attached to the stationary mirror-supporting standard. Fig. 8 represents a front view of the device with a bifurcated brake-actuating arm.

Like parts are identified by the same reference characters throughout the several views.

1 represents a mirror, 2 the mirror-supporting frame, and 3 the frame-supporting standard. The frame 2 is pivotally supported from the standards 3 at its respective sides upon pivots 4.

6 is a circular plate, which is permanently connected with one of the standards 3 by the screws 5 5.

7 is a friction bearing or brake, which is retained in contact with the convex surface 8 of the plate 6 by a radial arm 9. The radial arm 9 is pivotally connected with the horizontal base 10 of the plate 6 by the pivotal pin 12 and pin-retaining lugs 13, said pin 12 being located at the central point within the circle described by said circular plate 6, whereby the brake-bearing 7, which is adjustably supported at the outer end of the radial arm 9, is caused to describe a circle around the periphery of said plate. The bearing or brake 7 is adjustably supported upon said radial arm 9 and against the periphery of said plate 6 by a hand-nut 14, which hand-nut has screw-threaded bearings on said radial arm. It will be obvious that by this arrangement the friction of the brake-bearing 7 may be increased or diminished as the weight of the mirror may require by turning down the hand-nut 14 on the screw-threaded bearing of the arm 9. While the brake-bearing 7 is preferably made of metal and provided with a yielding cushion 16, formed of felt, leather, or other similar material, said brake may, if desired, be formed of metal alone or other hard substance and the cushion 16 dispensed with. Motion is communicated to the brake mechanism from the oscillating or pivotally-supported mirror through the brake-actuating bracket 17, which bracket is rigidly fixed to the surface of the mirror-supporting frame 2 by screws 18. The free or outer end of the bracket 17 has loosely-fitting bearings in the slot 19 of the radial arm 9, which permits of the change in the relative adjustment of such parts to each other. For example, in case the mirror-supporting frame is of greater or less thickness the bracket 17 will be farther from or nearer to the pivotal support of said radial arm, so in case the standard 3 is of greater or less thickness the relative adjustment of said radial arm 9 and bracket 17 will be in like manner changed to each other without materially affecting their coöperation with each other. It will of course be obvious that the circular bearing-plate 6, together with the brake and brake-supporting radial arm, may, if desired, be attached to the mirror-supporting frame and the bracket 17 attached to the frame-supporting standard, or, in other words, the relative position of such parts be changed, as shown in Figs. 6, 7, and 8, without changing the operation of the device or without departing from the essence or spirit of my invention. It will also be obvious that, if desired, said brake mechanism may be located upon the rear of the mirror and mirror-supporting standard instead of in front, as indicated in Fig. 7. It will be further understood that while I have shown and described the free end of the bracket 17 operating in a slot formed in the radial arms 9 the end of said bracket may be bifurcated, as shown in Fig. 8, in which case a fork of said bracket will be brought upon each side of said radial arm, and the slot 19 may be dispensed with.

In the modified form shown in Figs. 4 and 5 the radial arm 19' is supported entirely from the semicircular plate 6 and the central pivotal connection 12 is dispensed with. When the pivotal connection is dispensed with, I provide the radial arm 19' with an interior bearing-plate 20 in addition to the exterior bearing-plate 7 when the cushion 16 may be inserted between the bearing-plate 20 and the concave surface of the semicircular plate 6.

To provide for fastening the circular bearing-plate 6 and the arm 17 to convex surfaces, I preferably form the bases 10 and 10' of such parts with concave surfaces 12', as shown in Fig. 3, whereby they are adapted to be readily fitted to furniture having either flat or convex surfaces, as circumstances may require. The semicircular plate 6 is provided with a longitudinal slot 6' for the reception of the radial arm 9.

Having thus described my invention, what I claim as new, and desire to secure by Letters Patent, is—

1. The combination of a semicircular bearing-plate, a radial arm and a frictional bearing adjustably secured to said semicircular bearing-plate, an actuating-arm slidably connected with said radial arm and means for connecting said semicircular bearing-plate and actuating-arm with a pivotally-supported mirror and a mirror-supporting standard.

2. The combination of a semicircular bearing-plate, a radial arm pivotally connected at a central point within said bearing-plate, a frictional bearing adjustably secured to said radial arm and bearing-plate, an actuating-arm slidably connected with said radial arm and means for connecting said parts with a pivotally-supported mirror and a mirror-supporting standard.

3. The combination of a semicircular bearing-plate, a radial arm pivotally connected at a central point within said bearing-plate, a frictional bearing adjustably secured to said radial arm and bearing-plate, an actuating-arm adapted to be connected with said radial arm at various points of adjustment both laterally and radially and means for connecting said parts with a pivotally-supported mirror and a mirror-supporting standard.

4. The combination of a semicircular bearing-plate, a radial arm pivotally connected at a central point within said semicircular bearing-plate provided with a longitudinal slot for the reception of the free end of an actuating-arm, a frictional bearing adjustably secured to said radial arm and bearing-plate, an actuating-arm slidably connected with said radial arm and means for connecting said parts with a pivotally-supported mirror and a mirror-supporting standard.

5. The combination of a semicircular bearing-plate provided with a longitudinal slot for the reception of a radial arm, a radial arm operating in said slot pivotally connected at a central point within said semicircular bearing-plate, a contact-bearing adjustably secured to said radial arm and bearing-plate, an actuating-arm slidably connected with said radial arm and means for connecting said parts respectively with a pivotally-supported mirror and a mirror-supporting standard.

In testimony whereof I affix my signature in the presence of two witnesses.

JAMES B. ERWIN.

Witnesses:
 O. R. ERWIN,
 OSCAR KROESING.